United States Patent
Shima et al.

(10) Patent No.: US 9,766,848 B2
(45) Date of Patent: Sep. 19, 2017

(54) PRINTING SYSTEM AND PRINTING DEVICE

(71) Applicant: Seiko Epson Corporation, Tokyo (JP)

(72) Inventors: Shoji Shima, Shiojiri (JP); Katsutoshi Terashima, Azumino (JP); Tadashi Furuhata, Shiojiri (JP); Yoshihiro Ueno, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/817,603

(22) Filed: Aug. 4, 2015

(65) Prior Publication Data

US 2015/0339089 A1    Nov. 26, 2015

Related U.S. Application Data (63) Continuation of application No. 14/039,863, filed on Sep. 27, 2013, now abandoned.

(30) Foreign Application Priority Data

Oct. 1, 2012 (JP) ................ 2012-219141

(51) Int. Cl.
*G06F 3/12* (2006.01)
*G07G 5/00* (2006.01)

(52) U.S. Cl.
CPC ............ *G06F 3/1293* (2013.01); *G06F 3/121* (2013.01); *G06F 3/1204* (2013.01); *G06F 3/1229* (2013.01); *G06F 3/1234* (2013.01); *G06F 3/1285* (2013.01); *G06F 3/1294* (2013.01); *G07G 5/00* (2013.01); *G06F 3/1291* (2013.01)

(58) Field of Classification Search
CPC ...... G06F 3/1293; G06F 3/1204; G06F 3/121; G06F 3/1229; G06F 3/1234; G06F 3/1285; G06F 3/1294; G06F 3/1291; G07G 5/00
See application file for complete search history.

(56) References Cited

U.S. PATENT DOCUMENTS

| | | | |
|---|---|---|---|
| 6,502,147 B2 | 12/2002 | Reilly | |
| 2009/0033976 A1 | 2/2009 | Ding | |
| 2009/0046686 A1* | 2/2009 | Izaki | H04W 8/20 370/338 |
| 2009/0066996 A1 | 3/2009 | Minowa | |
| 2009/0188972 A1 | 7/2009 | Koakutsu | |
| 2009/0198582 A1 | 8/2009 | Tokorotani | |

(Continued)

FOREIGN PATENT DOCUMENTS

| | | |
|---|---|---|
| JP | 08-115183 A | 5/1996 |
| JP | 10-136143 A | 5/1998 |

(Continued)

*Primary Examiner* — Iriana Cruz
(74) *Attorney, Agent, or Firm* — Foley & Lardner LLP (57) ABSTRACT

A first printer 60 has a connection unit to which data is input and which outputs print data based on the input data; a first printer print unit 71 that prints; a detection unit 62B that detects if the input printing result contains an error when the printing result of the print data output from the connection unit is input; a reprint storage unit 65A that stores print data when the detection unit 62B detects an error; and a reprint control unit 62F that outputs print data stored in the reprint storage unit 65A from the connection unit when a predetermined specific condition is met.

9 Claims, 4 Drawing Sheets

(56) References Cited

U.S. PATENT DOCUMENTS

| | | | |
|---|---|---|---|
| 2009/0279133 A1* | 11/2009 | Nakatsuka | G06F 3/1219 358/1.15 |
| 2010/0027065 A1* | 2/2010 | Koakutsu | G06F 3/121 358/1.15 |
| 2011/0058215 A1 | 3/2011 | Yoshizumi et al. | |
| 2013/0057885 A1 | 3/2013 | Minowa | |

FOREIGN PATENT DOCUMENTS

| | | |
|---|---|---|
| JP | 2004-103020 A | 4/2004 |
| JP | 2004-192370 A | 7/2004 |
| JP | 2009-187078 A | 8/2009 |
| JP | 2011-060045 A | 3/2011 |
| JP | 2012-123597 A | 6/2012 |
| WO | 2006/123544 A1 | 11/2006 |

* cited by examiner

FIG. 4

PRINTING SYSTEM AND PRINTING DEVICE

CONTINUING APPLICATION DATA

This application is a continuation of, and claims priority under 35 U.S.C. §120 on, U.S. application Ser. No. 14/039,863 filed Sep. 27, 2013, which claims priority under 35 U.S.C. §119 on Japanese patent application no. 2012-219141, filed Oct. 1, 2012. The content of each such related application is incorporated by reference herein in its entirety.

BACKGROUND

1. Technical Field

The present disclosure relates to a printing system and a printing device.

2. Related Art

Systems that print receipts using a printer connected to a device such as a computer are known from the literature. See, for example, Japanese Unexamined Patent Appl. Pub. JP-A-2009-187078, and JP-A-2012-123597. The system disclosed in JP-A-2012-123597 has a printer that prints receipts and a printer that prints coupons, and prints receipts and coupons using plural printers.

However, in order to print using plural printers as described in JP-A-2012-123597 in a system that controls a single printer as described in JP-A-2009-187078, the configuration may be changed by adding another printer, for example. When the configuration of printers is changed, the configuration of the control device must also be changed to match the configuration of printers. For example, in order to detect an error in any of the printers and then report the error or print again, the control device must be reconfigured by adding the ability to control a printer that was added by changing the printer configuration. As a result, major changes must be made to the entire system, and modifying the system configuration is therefore not simple.

SUMMARY

The disclosure is a printing system including: a host device configured to transmit data; a first printing device including a connection unit configured to receive the data transmitted by the host device and to transmit the data, and a first print unit configured to print; and a second printing device including a second print unit configured to receive the data transmitted by the connection unit of the first printing device and to print based on the data, and an output unit configured to send a printing result by the second printing device to the connection unit of the first printing device. The first printing device includes a detection unit configured to detect if the printing result of the second printing device received by the connection unit is an error, and a storage unit configured to store the data transmitted to the second printing device when the detection unit detects the error in the printing result of the second printing device, and a control unit configured to determine if a predetermined specific condition is met.

In such a printing system, the control unit sends the data stored in the storage unit when the detection unit detects the error in the printing result of the second printing device to the second printing device when the specific condition is met; and the second printing device prints based on the data transmitted as controlled by the control unit.

In a printing system, the first printing device generates print data based on the data transmitted by the host device, and sends the generated print data by the connection unit to the second printing device.

In a printing system, a data input device is connected to the host device and configured to acquire identification information. The data transmitted by the host device includes the identification information acquired by the data input device; and the control unit determines that the specific condition is met when the host device transmits second data different from the data, and the identification information contained in the second data received by the connection unit matches the identification information contained in the data.

In a printing system, when the identification information contained in the second data matches the identification information contained in the data, the first printing device sends the data and the second data to the second printing device; and the second printing device prints based on the data and the second data.

In a printing system, when the detection unit detects that the printing result is an error, the control unit of the first printing device controls printing the data stored in the storage unit of the first printing device by the first print unit.

In a printing system, the control unit stores the data in the storage unit when the data could not be printed by the first print unit.

A printing system includes a storage device connected to the first printing device; and the control unit controls the connection unit to transmit the print data stored in the storage unit to the storage device.

In a printing system, the data transmitted by the host device contains transaction information; the first printing device includes a print data acquisition unit configured to acquire print data based on the transaction information contained in the data; and the second print unit of the second printing device prints a coupon based on the print data transmitted by the connection unit.

The disclosure is a printing device comprising: a connection unit configured to transmit received data and to receive a printing result for the transmitted data; a detection unit configured to detect if the printing result received by the connection unit is an error; a storage unit configured to store the data when the detection unit detects the error in the printing result; a print unit configured to print; and a control unit configured to determine if a predetermined specific condition is met. The control unit controls the connection unit to transmit the data that is stored in the storage unit when the detection unit detects the error in the printing result when the specific condition is met.

The control unit may include a print data acquisition unit configured to acquire print data based on the transaction information when the data contains transaction information.

DESCRIPTION OF EMBODIMENTS

A preferred embodiment of the present disclosure is described below with reference to the accompanying figures.

Figure 1:
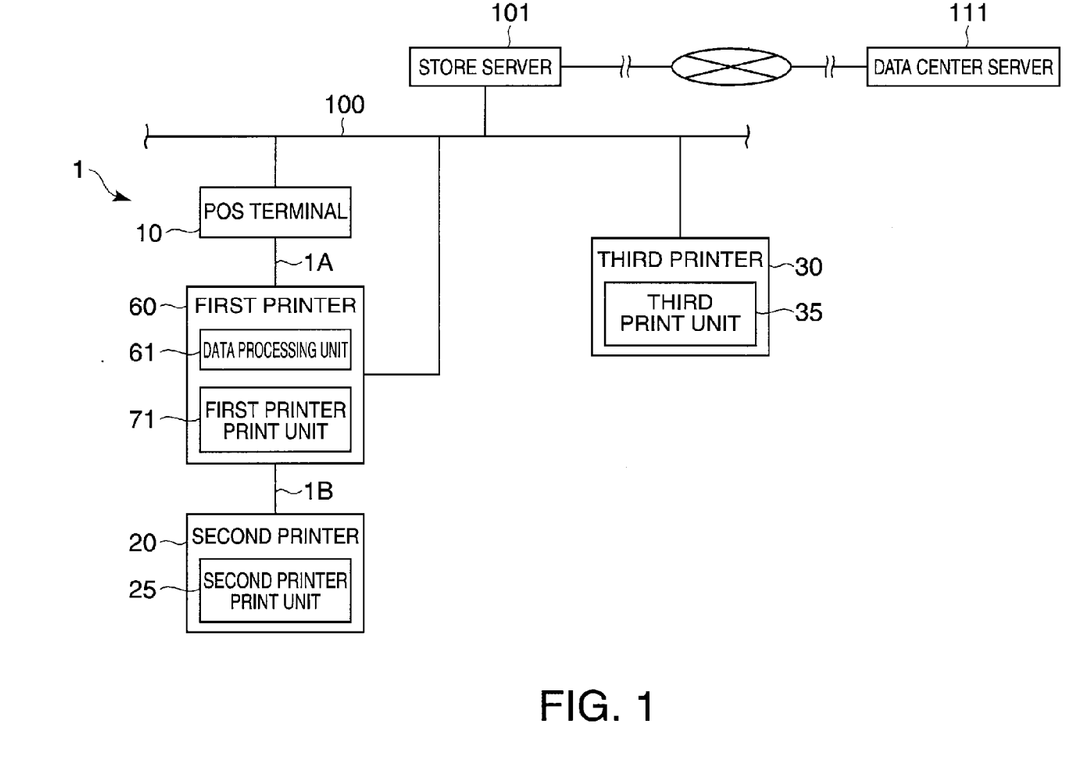
FIG. 1 is a block diagram of a POS system according to a preferred embodiment of the disclosure.
Figure 2:
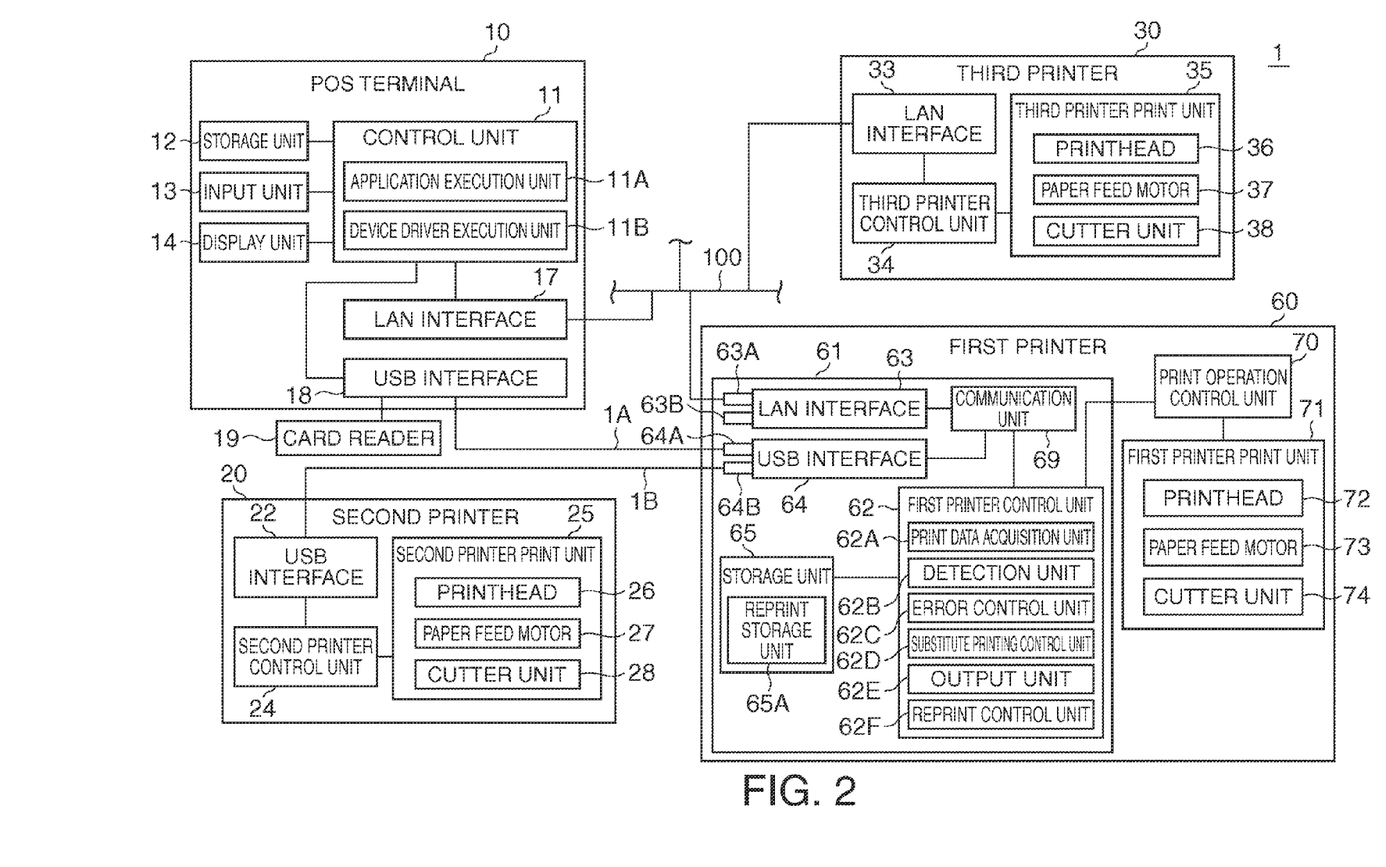
FIG. 2 is a function block diagram of devices in the POS system.

FIG. 1 shows the configuration of a POS system 1 according to a preferred embodiment of the disclosure, and FIG. 2 is a function block diagram of devices in the POS system 1. The configuration of the POS system 1 is described first below with reference to FIG. 1 and FIG. 2.

The POS (point of sale) system 1 described as a printing system according to the disclosure includes a first printer 60 (printing device, first printing device), a POS terminal 10 (host device), that runs an application program to generate documents and output print instructions, and a second printer 20 (second printing device) that prints according to the print instructions output by the POS terminal 10.

The first printer 60 is connected through USB cable 1A to the POS terminal 10, and the second printer 20 is connected through USB cable 1B to the first printer 60. In other words, the first printer 60 and second printer 20 are connected to the POS terminal 10 in a daisy chain.

The POS terminal 10 and first printer 60 are both also connected to an in-store LAN 100. A third printer 30 (third printing device) is also connected to the in-store LAN 100, and the POS terminal 10, third printer 30, and first printer 60 can communicate with each other through the in-store LAN 100.

The POS system 1 is used in a shopping center, department store, or other retail business, and is part of a POS management system that is used to manage product marketing, product inventory, and product sales in the business.

The POS terminal 10 is a device that runs a transaction process related to a purchase transaction by a customer and outputs transaction result information at a particular checkout counter in the business. A POS terminal 10 may be installed at each of plural checkout counters.

The POS terminal 10 includes a control unit 11 that controls other parts of the POS terminal 10, and a storage unit 12, input unit 13, and display unit 14 connected to the control unit 11. The POS terminal 10 has a LAN interface 17 or USB interface 18, or both, as interfaces for connecting external devices.

The control unit 11 includes a CPU and memory such as RAM or ROM, and controls other parts of the POS terminal 10 and executes the functions of a POS terminal 10 by running a program stored in the storage unit 12. The control unit 11 has an application execution unit 11A that runs a POS application program and executes a transaction process and receipt printing function, and a device driver execution unit 11B that runs a device driver program and controls a printer connected through the LAN interface 17 or USB interface 18.

The storage unit 12 stores the programs executed by the control unit 11 and data related to those programs.

The input unit 13 connects to an input device such as a keyboard for operating the POS terminal 10, and outputs data input from the input device to the control unit 11.

The display unit 14 displays data processed by the control unit 11 and the operating status of the POS terminal 10, for example, on an LCD or other type of display screen. The display unit 14 could include a customer display that displays the purchased products and price information for the customer when the POS terminal 10 executes the transaction process.

The LAN interface 17 has an Ethernet (R) connector or IEEE 802.11 wireless communication circuit, connects to the in-store LAN 100, and sends and receives data with other devices over the in-store LAN 100.

The USB interface 18 includes a USB connector and interface circuit conforming to the USB standard, and handles data communication with the second printer 20 and first printer 60.

A card reader 19 (data input device) connects to the USB interface 18. The card reader 19 reads information from a card such as a magnetic stripe card to which information is magnetically recorded, or a contactless smart card that has a chip that stores information and can transmit information by radio frequency communication, and outputs the read information to the POS terminal 10. The card reader 19 may read information by radio communication with the RF communication circuit in a cell phone or other mobile terminal, or by optically reading information from a card medium having information recorded as text or a barcode, for example. Using the card reader 19, the POS system 1 captures member information (such as a customer number) identifying a particular customer from the customer or member card of the person making a purchase. In other words, member information is assigned to a customer that has previously registered as a member, and individual customers can be identified by this member information.

A barcode scanner, electronic cash drawer, or other devices can also connect to the USB interface 18, but are not shown in the figure.

The POS terminal 10 may also have an RS-232C or other interface in addition to the LAN interface 17 and USB interface 18.

The application execution unit 11A executes a transaction process related to a product sale based on information input from the input unit 13 or the barcode scanner or other input device connected to USB interface 18, for example. The transaction process includes registering the products purchased by a customer, calculating the total price, registering the amount received, and calculating the amount of change due. Information read from the product barcode, or a product code, is input during the transaction process to the application execution unit 11A. The application execution unit 11A queries the store server 101 based on the input information, and acquires the product name and product price from a product database (not shown) maintained on the store server 101.

The application execution unit 11A outputs data to be printed and a print instruction to print a content of the transaction as a receipt after the transaction process is completed. If member information was read by the card reader 19, the member information is contained in the print data output by the application execution unit 11A, and the member information is also printed on the receipt.

The application execution unit 11A sends the result of the transaction process and/or data compiling the results of transaction processes during a specific period of time through the in-store LAN 100 to the store server 101. If member information was captured by the card reader 19, the application execution unit 11A sends the transaction process results linked to the member information to the store server 101. The store server 101 acquires the data sent by the POS terminal 10, acquires and compiles data sent by each POS terminal 10 when multiple POS terminals 10 are connected to the store server 101, and stores the data in a storage device not shown. When member information is contained in the data received from the POS terminal 10, the store server 101 may also store the data relationally to the member information. The store server 101 could also send the stored data to the data center server 111 at predetermined times.

The device driver program run by the device driver execution unit 11B is compatible with the device connected through the LAN interface 17, or the device connected through the USB interface 18. More specifically, the device driver execution unit 11B in this embodiment is compatible with the second printer 20, and runs a device driver program that causes the second printer 20 to print a receipt. The device driver execution unit 11B acquires the print instruction and data output by the application execution unit 11A, generates a print command and print data for printing the output data according to the received print instruction, and outputs the print command and print data to an external device. The interface to which the target device (the device to control) is connected is set in the device driver execution unit 11B. The device driver execution unit 11B outputs the print command and print data (print job) to the LAN interface 17 or USB interface 18, and more specifically to the interface to which the second printer 20 is connected.

The second printer 20 is connected through the first printer 60 to the USB interface 18 in this embodiment, but the device driver program run by the device driver execution unit 11B does not need to be compatible with the first printer 60. The device driver execution unit 11B executes a device driver program compatible with the second printer 20, and outputs print commands and print data compatible with the second printer 20. The USB interface 18 transmits the print commands and print data sent from the device driver execution unit 11B through a USB cable 1A conforming to the USB standard. The POS terminal 10 therefore operates in the same way as when the second printer 20 is connected to the USB interface 18, and does not need a function for controlling the first printer 60.

The second printer 20 includes a USB interface 22 and a second printer control unit 24 that receives commands through the USB interface 22. The second printer control unit 24 receives print command and print data through the USB interface 22, and executes the received print command and controls the second printer print unit 25 to print. The second printer control unit 24 also sends status information describing the current operating status from the USB interface 22 when printing is successful, when an error occurs, and when a status report request is received from the USB interface 22.

The second printer print unit 25 includes a printhead 26 that forms characters and images on roll paper, cut-sheet paper, or other print medium as controlled by the second printer control unit 24; a paper feed motor 27 that conveys the print medium as controlled by the second printer control unit 24; and a cutter unit 28 that cuts the print medium as controlled by the second printer control unit 24.

The second printer 20 is a thermal printer with a thermal printhead that applies heat to thermal paper as the printhead 26.

If data (text data) that specifies the characters to be printed using character codes is included in the print data received by the USB interface 22, the second printer control unit 24 reads the font data corresponding to the character codes from a storage unit in the second printer 20, and prints with the second printer print unit 25.

Because the device driver execution unit 11B generates print data according to the specifications of the second printer 20 as described above, when characters are contained in the data output by the application execution unit 11A, the device driver execution unit 11B generates and sends print data containing the character codes for those characters to the USB interface 18.

The print commands and print data output by the POS terminal 10 from the USB interface 18 are first received by the first printer 60, and then sent by the first printer 60 to the second printer 20. The first printer 60 thus relays the data output by the POS terminal 10.

The first printer 60 has a function for relaying data sent from the POS terminal 10 to the second printer 20. The first printer 60 also has a function for acquiring and sending to the second printer 20 print commands and print data for coupons related to the receipt when the POS terminal 10 sends print commands and print data containing transaction information.

In this instance, the first printer 60 prints a receipt based on the print command and print data the POS terminal 10 sent to the second printer 20, and causes the second printer 20 to print the coupon.

The second printer 20 receives print commands and print data from the first printer 60, but operates in this event based on the received print commands and print data in the same way as when the second printer 20 is connected directly through a USB cable to the POS terminal 10 instead of through the first printer 60. Providing the second printer 20 with a function for operating as controlled by the first printer 60 is therefore not necessary.

The POS system 1 also has a dedicated third printer 30 for printing coupons. The third printer 30 has a LAN interface 33 that connects to the in-store LAN 100, and a third printer control unit 34 that receives print data sent by the POS terminal 10 through the LAN interface 33. The third printer control unit 34 controls printing coupons based on the received print data.

For example, the third printer 30 receives the print data sent by the POS terminal 10 to the third printer 30, analyzes the text data (character codes) contained in the received data, and detects a predetermined character or string in the text data. If the predetermined character or string is detected, the third printer control unit 34 accesses the store server 101 through the LAN interface 33, and retrieves data for printing a coupon corresponding to the detected character or string.

The third printer control unit 34 prints the print data for a coupon acquired from the store server 101 with the print unit 35.

The third printer print unit 35 includes a printhead 36 that prints characters and images on roll paper, cut-sheet paper, or other print medium as controlled by the third printer control unit 34; a paper feed motor 37 that conveys the print medium as controlled by the third printer control unit 34; and a cutter unit 38 that cuts the print medium as controlled by the control unit 34.

The first printer 60 includes a first printer print unit 71 (print unit) that prints on roll paper or cut-sheet paper, print operation control unit 70 (print control unit) that controls the printing operation of the first printer print unit 71, and a data processing unit 61.

The data processing unit 61 includes a control unit 62 (control unit), a LAN interface 63, a USB interface 64, a storage unit 65, and a communication unit 69 (first printer communication unit). The first printer control unit 62 includes CPU, RAM, ROM, and other peripheral circuits and controls parts of the first printer 60 by running a program stored in the storage unit 65.

The LAN interface 63 has an Ethernet® connector or IEEE 802.11 wireless communication circuit, can connect to the in-store LAN 100 or other network, and exchanges data with other devices. The LAN interface 63 also has a plurality of connectors 63A, 63B, and can exchange data with each of the other devices connected to the connectors. In this embodiment, for example, the LAN interface 63 exchanges data with the POS terminal 10, third printer 30, store server 101, and other devices connected through the in-store LAN 100 as controlled by the communication unit 69.

The LAN interface 63 also functions as a network hub with a relay function, and can output data received through either connector 63A, 63B from the other connector.

The USB interface 64 includes a USB connector and interface circuit conforming to the USB standard, and handles data communication with the POS terminal 10. The USB interface 64 has a plurality of USB connectors that can connect to a USB cable, and in this embodiment has two connectors 64A, 64B.

In this embodiment, connector 64A is a type-B female connector (receptacle) with the shape and pins specified by the USB standard for a target device connector, and can connect to a standard USB cable. The USB interface 64 has the functions of a USB device controller that operates as a target device as defined in the USB standard, reports the USB device class ID and device ID to the device connected through a USB cable to connector 64A, and communicates according to the control data sent from the connected device. The connector 64A may be a mini-USB B-connector or a micro-USB B-connector.

The other connector 64B of the USB interface 64 is a type-A female connector with the shape and pins specified by the USB standard for a host device connector, and can connect to a standard USB cable. The USB interface 64 has the functions of a USB host controller that operates as a host device as defined by the USB standard, operates as a host to the connected device when a device classified as a target device by the USB standard is connected to connector 64B, the USB interface 64, and can recognize the device and communicate with the device. The connector 64B may be a mini-USB A-connector or a micro-USB A-connector. The number of connectors 64B in the USB interface 64 is not specifically limited.

Note that a target device as used herein is an input/output device that connects to a device operating as a host, outputs data to the host as controlled by the host, or outputs data input from the host.

A host as used herein is a computer or other control device that sends commands controlling the I/O devices to the I/O devices operating as target devices.

The USB interface 64 functions as a connection unit connected to the POS terminal 10 and second printer 20 in this embodiment, but when the POS terminal 10 is connected to the first printer 60 through the in-store LAN 100, and the second printer 20 is connected to the first printer 60 through the USB interface 64, the LAN interface 63 and USB interface 64 function as connection units. When the POS terminal 10 sends print commands and print data through the in-store LAN 100 to the third printer 30, the LAN interface 63 functions as a connection unit.

The first printer control unit 62 acquires the print command and print data sent by the POS terminal 10 through the LAN interface 63 or USB interface 64, whichever is used as the connection interface, and based on the acquired print data, sends the data for printing to the print operation control unit 70.

The print operation control unit 70 controls the first printer print unit 71 based on the print data sent by the first printer control unit 62, and prints on the roll paper, cut-sheet paper, or other print medium.

The first printer print unit 71 includes a printhead 72 that forms characters and images on the print medium, a paper feed motor 73 that conveys the print medium, and a cutter unit 74 that cuts the print medium, and these units operate as controlled by the print control unit 70 (first printer print control unit).

The data processing unit 61 may be an inkjet printer or thermal printer, for example. When the first printer 60 is an inkjet printer, the first printer 60 has an inkjet printhead 72 that ejects four colors of ink, CMYK, onto the printing surface of the print medium to form characters and images. The printhead 72 could be a printhead that uses two colors of ink, red and black, or a printhead that uses the four CMYK colors plus additional colors of ink. When the first printer 60 is a thermal printer, the printhead 72 is a thermal head that applies heat to the printing surface of the print medium.

When configured as an inkjet printer, the first printer 60 is suited to printing graphic data (image data). In this embodiment the first printer control unit 62 generates image data by page unit specifying the position, size, and color of the characters and images printed on the print medium, and sends this image data to the print control unit 70.

When the first printer 60 is a thermal printer, the first printer 60 is suited to printing text data. In this configuration the first printer control unit 62 sends data containing the character codes of the characters to print on the print medium to the print operation control unit 70. The print operation control unit 70 then reads the font data corresponding to the character codes from a storage unit not shown of the print operation control unit 70, and controls the first printer print unit 71 to print.

When a problem with a part of the first printer print unit 71 is detected, or a problem in a process executed by the print operation control unit 70 is detected, the print operation control unit 70 reports an error to the first printer control unit 62. The first printer control unit 62 may also be configured so that it can communicate with the print operation control unit 70 to detect a problem in the print operation control unit 70 or first printer print unit 71.

The first printer control unit 62 includes a print data acquisition unit 62A that acquires print data; a detection unit 62B that detects errors in the second printer 20 and print operation control unit 70; an error control unit 62C (reporting unit) that controls reporting errors to the POS terminal 10 when the detection unit 62B detects an error; a substitute printing control unit 62D that controls a substitute printing operation that substitutes for the second printer 20 or print operation control unit 70 in which an error was detected; an output unit 62E that sends print commands and print data; and a reprint control unit 62F.

The print data acquisition unit 62A acquires the print commands and print data sent by the POS terminal 10 to the second printer 20. When the POS terminal 10 is connected to the USB interface 64 as shown in FIG. 1 and FIG. 2, the print data acquisition unit 62A receives and acquires the print data by means of the USB interface 64 through the communication unit 69.

When the LAN interface 63 is connected to the in-store LAN 100 or other network, the print data acquisition unit 62A can receive by means of the communication unit 69 print data sent by the POS terminal 10 over the network to another printer. In this event, the communication unit 69 controls the LAN interface 63, and can also receive other data than data addressed to the network address assigned to the LAN interface 63. Based on the network address assigned to the received data, the communication unit 69 extracts the print data sent to the target printer from the received data.

The print data acquisition unit 62A temporarily stores the print command and print data sent from the POS terminal 10 to the storage unit 65, and passes the data to the second printer 20.

The print data acquisition unit 62A acquires new print data based on the print data received by the communication unit 69. More specifically, the print data acquisition unit 62A can acquire print data for a coupon based on the receipt print data sent by the POS terminal 10 to the second printer 20. For example, the print data acquisition unit 62A interprets the text data (character codes) contained in the print data sent from the POS terminal 10, and detects a predetermined character or string from this text data. When the predetermined character or string is detected, the print data acquisition unit 62A controls the communication unit 69, accesses the store server 101 through the LAN interface 63, and acquires data for printing based on the detected character or string. The print data acquired by the print data acquisition unit 62A here is print data for a coupon.

For example, when an error occurs in the second printer 20, and the second printer 20 outputs an error report, the detection unit 62B detects an error in the second printer 20 as a result of receiving this error report.

The detection unit 62B also detects errors in the print operation control unit 70 by communicating command data with the print operation control unit 70, and receiving an error report output by the print operation control unit 70 when a problem occurs in the first printer print unit 71 or the control operation of the print operation control unit 70.

The error control unit 62C sends an error report to the POS terminal 10 when the detection unit 62B detects an error. The conditions for sending a report to the POS terminal 10 can be preset in the error control unit 62C. The storage unit 65 also stores data setting the conditions for the error control unit 62C to report an error to the POS terminal 10.

Based on the data stored in the storage unit 65, the error control unit 62C determines if the error detected by the detection unit 62B meets a condition for sending an error report, controls the communication unit 69 based on this decision, and can send an error report from the USB interface 64 to the POS terminal 10. This error report could relay an error report command received from the second printer 20 through the USB interface 64, or an error report command generated by the error control unit 62C. The error report could report that an error occurred, or report that the print job output by the POS terminal 10 is unfinished or cannot be executed.

When printing by the first printer print unit 71 is completed (successful), the error control unit 62C could also report that printing was successful to the POS terminal 10.

When the detection unit 62B detects a second printer 20 error, the substitute printing control unit 62D executes a substitute printing process to print with the first printer print unit 71 instead of the second printer 20. More specifically, when the detection unit 62B detects a second printer 20 error, the substitute printing control unit 62D outputs the print commands and print data sent to the second printer 20 by the POS terminal 10 from the output unit 62E to the print operation control unit 70, and prints a coupon with the print operation control unit 70. The substitute printing control unit 62D could alternatively use the third printer 30 to print the coupon to be printed with the second printer 20. In this instance, the substitute printing control unit 62D outputs the print commands and print data sent to the second printer 20 by the POS terminal 10 from the output unit 62E to the third printer 30.

When an error occurs in the second printer 20 and the first printer 60 could not print the print data sent to the second printer 20, the reprint control unit 62F temporarily stores the data for that print job (print data) in the storage unit 65, and when a specific condition is then met, sends the print job data stored in the storage unit 65 to the second printer 20 and prints with the second printer 20. The print job data as used here includes the print commands and print data.

A reprint storage unit 65A is included in the storage area of the storage unit 65 as shown in FIG. 2. The reprint storage unit 65A stores print job data as controlled by the reprint control unit 62F. The reprint storage unit 65A can also store data for plural print jobs.

Whether or not to reprint a job can be set in the reprint control unit 62F separately for the print operation control unit 70 and the second printer 20. For example, print jobs that are printed by the print operation control unit 70 could be reprinted, while print jobs that are printed by the second printer 20 are not reprinted.

Conditions for causing the reprint control unit 62F to print include conditions (1) to (3) below.

(1) A second printer 20 error occurred.

(2) The substitute printing control unit 62D is set to not substitute print, and a second printer 20 error was cleared.

(3) The POS terminal 10 output a print command and print data, and member information contained in the print data is the same as the member information contained in data stored in the reprint storage unit 65A.

The reprint control unit 62F determines that conditions (1) and (2) have been met when the detection unit 62B determines based on an error report sent by the second printer 20 that the error was resolved and the printer returned to the normal operating state.

When condition (3) is set, if data for plural print jobs is stored in the reprint storage unit 65A, the reprint control unit 62F determines if member information contained in the data for each print job matches the member information contained in the print data sent by the POS terminal 10, and reprints any print job containing matching member information.

Data describing settings content, that is, whether or not to reprint and the specific content related to setting a specific condition, is stored in the storage unit 65. Operation of the reprint control unit 62F can also be set by combining plural conditions.

To print the data for a print job stored in the reprint storage unit 65A when a specific condition is determined met, the reprint control unit 62F sends the print job data to the second printer 20 and deletes the data for the transmitted print job from the reprint storage unit 65A.

If an error occurs while printing after the reprint control unit 62F sends print job data for reprinting to the second printer 20, another function of the reprint control unit 62F stores the print command and print data in the reprint storage unit 65A. Because this enables reprinting again after an error occurs during reprinting, printing can be reliably completed and the same data is not duplicated in the reprint storage unit 65A. The reprint control unit 62F can thus avoid duplicating data by deleting the data from the reprint storage unit 65A after outputting print job data read from the reprint storage unit 65A.

Another method of avoided data duplication is to regularly execute a process of comparing print job data stored in the reprint storage unit 65A to detect duplicates. This method is particularly effective when unique identification information (such as a receipt number) is contained in the data for each print job.

The first printer 60 has a mechanical assembly embodying the first printer print unit 71, a main circuit board not shown to which the print operation control unit 70 is disposed, and the data processing unit 61 as a discrete circuit board separate from the main circuit board. More specifically, the first printer control unit 62, LAN interface 63, USB interface 64, storage unit 65, and communication unit 69 are mounted on a circuit board separate from the main board, and connect to the print operation control unit 70 through an inter-board interface.

Figure 3:
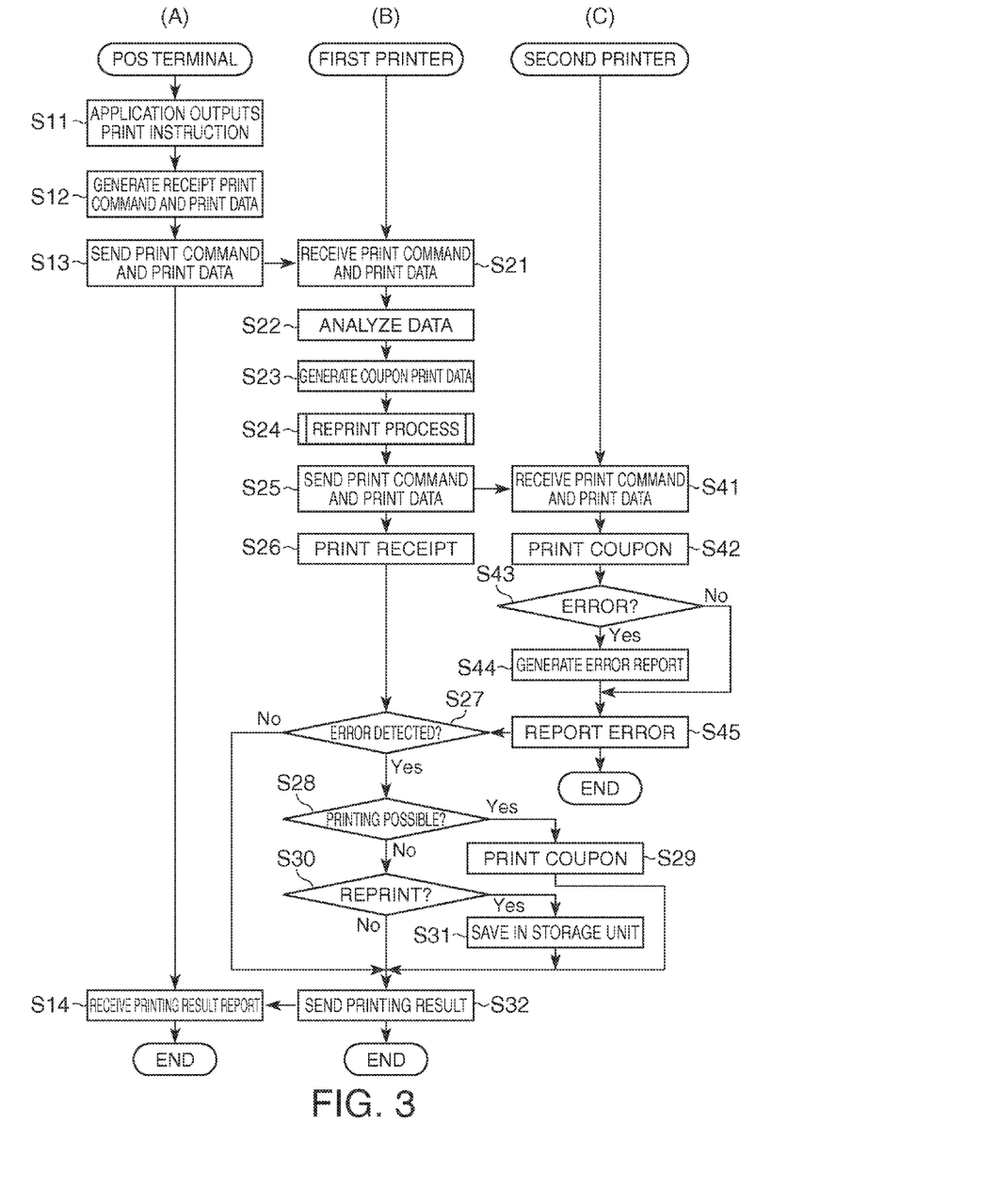
FIG. 3 is a flowchart showing the operating sequence of parts in the preferred embodiment of the disclosure.

FIG. 3 is a sequence diagram showing the operation of parts of the POS system 1, column (A) showing the operation of the POS terminal 10, (B) showing the operation of the first printer 60, and (C) showing the operation of the second printer 20. FIG. 3 describes operation when an error is detected when the second printer 20 prints a receipt.

When the application execution unit 11A runs the POS application program, executes a transaction process and outputs a print instruction for a receipt (step S11), the device driver execution unit 11B generates a print command and print data for the second printer 20 (step S12), and sends the generated print command and print data from the USB interface 18 to the first printer 60 (step S13).

The print data acquisition unit 62A of the first printer 60 receives the print command and print data sent from the POS terminal 10 through the communication unit 69 and the USB interface 64, and temporarily stores the received command and data in the storage unit 65 (step S21).

The print data acquisition unit 62A then analyses the print data stored in the storage unit 65 (step S22), selectively acquires the appropriate data from the print data for coupon printing previously stored in the storage unit 65, and generates coupon print data (print command and print data) (step S23). Data for coupon printing could be previously stored in the storage unit 65 of the first printer 60, and the print data acquisition unit 62A could selectively acquire data with a high correlation to the print data sent from the POS terminal 10 from the stored coupon print data. Further alternatively, the print data acquisition unit 62A could access the store server 101 to acquire the the data for printing a coupon.

The reprint process is then executed (step S24) based on the member information contained in the print data received in step S21. This reprint process is described below with reference to FIG. 4.

The print data acquisition unit 62A then sends the generated print command and print data from the USB interface 64 to the second printer 20 (step S25). When print command and print data to be sent to the second printer 20 is acquired in the reprint process in step S24, that print command and print data is also sent to the second printer 20 in step S25.

The second printer control unit 24 of the second printer 20 receives the paper conveyance device through the USB interface 22 (step S41), and prints a coupon (step S42).

If an error occurs in the second printer 20 (step S43 returns YES), the second printer control unit 24 generates an error report, which is a command reporting that an error occurred (step S44), and sends the error report from the USB interface 22 (step S45). An error in the second printer 20 could be the second printer print unit 25 running out of paper, overheating, a mechanical failure, or a software error in the second printer control unit 24, for example. If the second printer 20 finished printing normally (step S43 returns NO), the second printer control unit 24 sends a printing success report from the USB interface 22.

The detection unit 62B of the first printer 60 receives the report sent by the second printer 20 through the USB interface 64 (step S26), and based on the received report determines if an error occurred in the second printer 20 (step S27).

If an error occurred (step S27 returns YES), the substitute printing control unit 62D determines if the first printer print unit 71 can be used to print instead of the second printer 20 (step S28). The substitute printing control unit 62D can include the third printer 30 connected through the in-store LAN 100 as a substitute printer in addition to the first printer print unit 71.

When the substitute printing control unit 62D can print using the first printer print unit 71 instead of the second printer 20 (step S28 returns YES), the output unit 62E outputs the print commands and print data sent to the second printer 20 in step S25 to the print operation control unit 70, prints a coupon using the first printer print unit 71 (step S29), and then goes to step S32. The output unit 62E could convert the print commands and print data to data in a format appropriate to the print operation control unit 70 at this time.

If the first printer print unit 71 cannot substitute print for the second printer 20 (step S28 returns NO), the reprint control unit 62F checks the reprint setting based on the settings data stored in the storage unit 65 (step S30). If reprinting is enabled (step S30 returns YES), the reprint control unit 62F stores the print commands and print data sent to the second printer 20 in step S25 in the reprint storage unit 65A (step S31), and goes to step S32.

If reprinting is not enabled (step S30 returns NO), control goes to step S32.

In step S32 the error control unit 62C reports the result of printing to the POS terminal 10 based on the conditions defined by the data stored in the storage unit 65. The error control unit 62C also reports to the POS terminal 10 that printing ended in step S26, or reports that an error occurred in the first printer print unit 71 in step S26.

The POS terminal 10 receives the printing result report through the USB interface 18 (step S14), and reports accordingly to the operator of the POS terminal 10 based on the received printing result report.

If a second printer 20 error was not detected (step S27 returns NO), the error control unit 62C goes directly to step S32 and reports the printing result.

Figure 4:
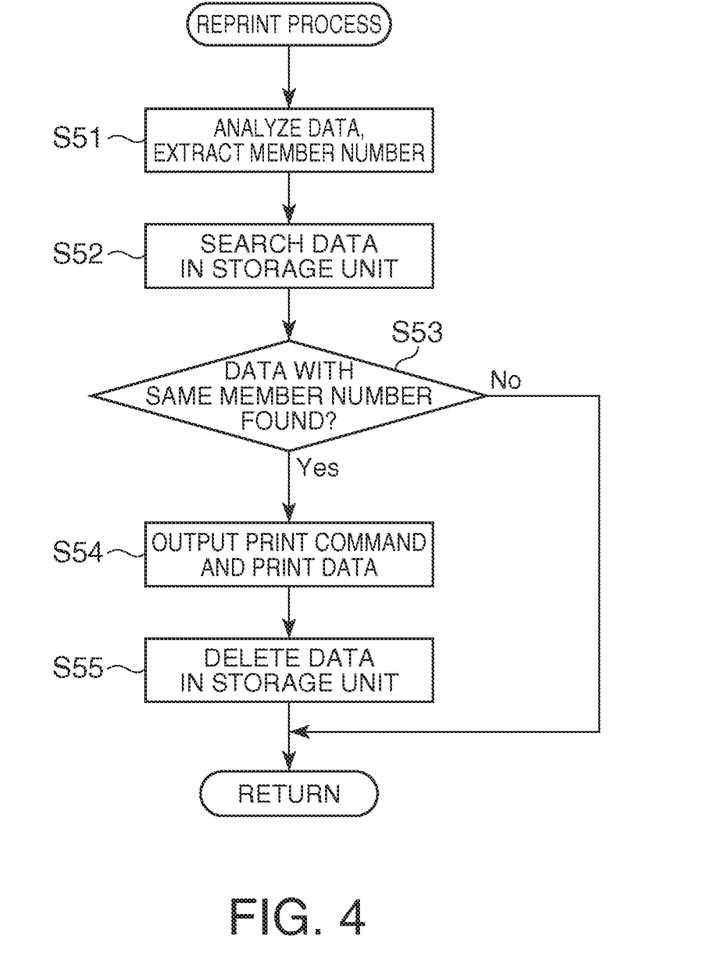
FIG. 4 is a flow chart showing the reprint process.

FIG. 4 is a flow chart showing the reprint process (step S24 in FIG. 3) more specifically.

The reprint control unit 62F analyzes the print data received from the POS terminal 10, and extracts the member information contained in the print data (step S51). The reprint control unit 62F searches for print job data stored in the reprint storage unit 65A (step S52, and determines if there is data containing the same member information as the member information extracted in step S51 (step S53).

If data containing the same member information as the member information extracted in step S51 is found in the print job data stored in the reprint storage unit 65A (step S53 returns YES), the reprint control unit 62F extracts that data from the reprint storage unit 65A and acquires the print command and print data (step S54). The acquired print command and print data is output in step S25 in FIG. 3 to the second printer 20 with the newly acquired coupon print command and print data. When printing a coupon, the second printer 20 therefore also prints coupons that should be output for the same customer.

To avoid duplicating data in the reprint storage unit 65A as described above, the reprint control unit 62F deletes print job data read from the reprint storage unit 65A from the reprint storage unit 65A (step S55), and then returns to the process shown in FIG. 3.

If data including the same member information as the member information extracted in step S51 is not found in the print job data stored in the reprint storage unit 65A (step S53 returns NO), the reprint control unit 62F ends this process and returns to the process in FIG. 3.

The reprint process in FIG. 4 is normally executed when an error detected by the detection unit 62B has been resolved, but to handle situations in which the reprint process in FIG. 4 executes without an error having been resolved, a step in which the detection unit 62B confirms that second printer 20 errors have been resolved could be executed before step S51 in FIG. 4.

As described above, a POS system 1 according to this embodiment of the disclosure has a POS terminal 10 that transmits print data; a first printer 60 having a connection unit that receives the print data the POS terminal 10 transmitted and transmits print data based on the received print data, and a first printer print unit 71 that prints; a second printer 20 having a second printer print unit 25 that prints based on print data sent by the connection unit of the first printer 60, and a second printer control unit 24 that sends the result of printing by the second printer print unit 25 to the connection unit of the first printer 60. The first printer 60 also has a detection unit 62B that detects errors based on the printing result of the second printer 20 input to the connection unit; a reprint storage unit 65A that stores print data when a second printer 20 error is detected by the detection unit 62B; and a reprint control unit 62F that sends print data stored in the reprint storage unit 65A to the second printer 20 for printing by the second printer 20 when a predetermined specific condition is met.

The first printer 60 thus has a connection unit that receives data and transmits print data based on the received data; a first printer print unit 71 that prints; a detection unit 62B that detects errors in the received printing result when the result of printing the print data sent from the connection unit is received; a reprint storage unit 65A that stores print data when an error is detected by the detection unit 62B; and a reprint control unit 62F that sends print data stored in the reprint storage unit 65A from the connection unit when a predetermined specific condition is met.

As a result, when an error occurs in the second printer 20 and the second printer 20 cannot print, the second printer 20 can be driven to print and the printout can be obtained after the error is resolved, for example. There is no need to add a new control function to the POS terminal 10 because the first printer 60 runs the process of storing print data in the reprint storage unit 65A, and sends the print data when the specific condition is met. A reprint function that executes when a printing error occurs can therefore be achieved without changing the configuration of the POS terminal 10, that is, the control-side device.

Furthermore, because the POS terminal 10 transmits the print data and member information (identification information) is contained in the print data and can be acquired from the print data, the reprint control unit 62F acquires the member information contained in the print data received by the connection unit from the POS terminal 10, extracts data for a print job containing the same member information from the data stored in the reprint storage unit 65A, and sends the extracted print data to the second printer 20, print data that was not printed due to an error can be reprinted at the time related data is printed. Printing can therefore be completed at the appropriate time when resolving the error takes a long time or the time for outputting the printout is limited, for example. As a result, when a coupon that should be printed at the time of a customer purchase is not printed due to an error, the coupon can be printed later when the same customer makes another purchase. Issuing coupons to an unrelated customer, and making a customer wait for a coupon to be reprinted, can therefore be prevented.

Furthermore, because the reprint control unit 62F of the first printer 60 prints the print data sent from the connection unit to the second printer 20 with the first printer print unit 71 when the detection unit 62B detects a second printer 20 error, and stores the print data in the reprint storage unit 65A if a first printer print unit 71 error is detected, the first printer print unit 71 can be driven to print and quickly produce the printout when a second printer 20 error is detected. If the print data also cannot be printed by the substitute printer, the print data is stored and can be reprinted at a later time. The printout can be reliably produced even when an error occurs by thus combining substitute printing and reprinting. Because the first printer 60 controls substitute printing by the second printer 20 or print operation control unit 70, and controls storing and reprinting print jobs, there is no need to add a new control function to the POS terminal 10, and there is no need to modify the configuration of the POS terminal 10 in order to add this function.

Furthermore, because the first printer 60 has an internal reprint storage unit 65A, an external storage device is not needed, and a reprinting function can be achieved by simply connecting the first printer 60 without greatly changing the configuration of the POS terminal 10.

Note that a configuration in which the first printer 60 sends the print commands and print data sent to the second printer 20 to an external storage device, such as a storage device (not shown in the figure) disposed to the store server 101, when a second printer 20 error occurs is also conceivable.

A preferred embodiment of the disclosure is described above, but the disclosure is not limited thereto. For example, the foregoing embodiment describes a POS system 1 in which a POS terminal 10 that runs a POS application program is the host device, and a second printer 20 and/or third printer 30 is connected to the POS terminal 10, but the disclosure is not so limited. The disclosure can also be applied to a system having the printers connected to a host device that executes a different data process, and prints other types of forms.

A configuration in which a POS terminal 10 used as the host device sends print commands and print data to the printers is described above, but a mobile device can be used instead of the POS terminal 10, and client devices connected by a communication line to a server installed in a remote location can also be used. In this embodiment, the remote server can run an application program, and the client can send print commands and print data generated and transmitted by the server to the printers.

The printers are also not limited to connecting to the POS terminal 10 by wire, and could connect to the POS terminal 10 wirelessly.

The foregoing embodiment describes the first printer 60 outputting print commands and print data to the second printer 20 and printing coupons based on print commands and print data sent from the POS terminal 10, but the same process can be applied to the third printer 30. In this embodiment, the print data acquisition unit 62A acquires the print commands and print data sent by the POS terminal 10 through the LAN interface 63, acquires the coupon print commands and print data based on the acquired print commands and print data, and sends these print commands and print data from the USB interface 64 to the third printer 30 through the LAN interface 63. In this embodiment, the detection unit 62B detects errors based on the report output by the third printer 30, and when an error is detected, the substitute printing control unit 62D determines if the first printer print unit 71 can print instead of the third printer 30. If the first printer print unit 71 can print, the output unit 62E sends the print commands and print data sent to the third printer 30 to the print operation control unit 70, and prints a coupon with the first printer print unit 71. If the first printer print unit 71 can be substituted to print for the third printer 30, the reprint control unit 62F stores the print commands and print data sent to the third printer 30 in the reprint storage unit 65A. These print commands and print data are reprinted in the same way as the operation described with reference to FIG. 4. The disclosure can thus also be applied to a configuration in which the printer that the first printer 60 controls is connected through the LAN interface 63.

The POS terminal 10, second printer 20, and first printer 60 in the foregoing embodiments are described as connecting through a USB interface or an in-store LAN 100 through an Ethernet connection, but the disclosure is not so limited. For example, the disclosure can be applied to any configuration using any interface enabling data communication between plural devices.

The first printer 60 used as an example of a printing device in the foregoing embodiments is described as combining a reprinting control device, storage device, and detection device of the disclosure in a single device, but a configuration having a detection device with the function of the detection unit 62B of the first printer control unit 62, a control device with the function of the reprint control unit 62F, and a storage device that stores print job data in the same way as the reprint storage unit 65A rendered separately from the POS terminal 10, second printer 20, and first printer 60 is also conceivable. In this configuration these devices are connected to the POS terminal 10 and second printer 20, and the print operation control unit 70 of the first printer 60 can be controlled to print.

The second printer print unit 25 of the second printer 20, the print unit 35 of the third printer 30, and the first printer print unit 71 of the first printer 60 in the foregoing embodiments are described as printing to cut-sheet paper or roll paper. The print units are not limited to a particular printing method, however, and a thermal printer, inkjet printer, dot impact printer, laser printer, or other type of printer may be used. Of the function blocks shown in the FIG. 1 and FIG. 2, parts including at least the control units can be achieved through the cooperation of hardware and software, and do not suggest a specific hardware configuration. A configuration that executes the operations including the operations shown in the accompanying sequence diagrams can also be embodied by these parts executing a program stored on an externally connectable non-transitory storage medium.

The disclosure being thus described, it will be obvious that it may be varied in many ways. Such variations are not to be regarded as a departure from the spirit and scope of the disclosure, and all such modifications as would be obvious to one skilled in the art are intended to be included within the scope of the following claims.

The present disclosure is directed to solving the foregoing problem, and an object of the disclosure is to enable changing the printing configuration, and to enable printing again when an error occurs, for example, without greatly changing the configuration of the control device in a system that controls a printer.

One aspect of the disclosure is a printing system including: a host device configured to transmit data; a first printing device including a connection unit configured to receive the data transmitted by the host device and to transmit the data, and a first print unit configured to print; and a second printing device including a second print unit configured to receive the data transmitted by the connection unit of the first printing device and to print based on the data, and an output unit configured to send a printing result by the second printing device to the connection unit of the first printing device.

In a printing system according to another aspect of the disclosure, the first printing device includes a detection unit configured to detect if the printing result of the second printing device received by the connection unit is an error, and a storage unit configured to store the data transmitted to the second printing device.

In a printing system according to another aspect of the disclosure, the first printing device includes a control unit configured to determine if a predetermined specific condition is met.

In a printing system according to another aspect of the disclosure, the control unit sends the data stored in the storage unit to the second printing device when the specific condition is met; and the second printing device prints based on the data transmitted as controlled by the control unit.

In a printing system according to another aspect of the disclosure, the first printing device generates print data based on the data transmitted by the host device, and sends the generated print data by the connection unit to the second printing device.

The first printing device of the disclosure sends print data based on data output by the host device to the second printing device, stores the print data in the storage unit when the first printing device detects an error in the second printing device, and sends the stored print data to the second printing device when a specific condition is met. As a result, when an error occurs in the second printing device and the second printing device cannot print, printing by the second printing device can be repeated and the desired printout obtained after the error is resolved. Because the first printing device handles storing the print data and transmitting the print data when a specific condition is met, there is no need to provide a new control function in the host device. The ability to reprint when a printing error occurs can therefore be achieved without changing the configuration of the host device, that is, the control-side device.

In a printing system according to another aspect of the disclosure, a data input device connected to the host device, configured to acquire identification information; wherein the data transmitted by the host device includes the identification information acquired by the data input device; and the control unit determines that the specific condition is met when the host device transmits second data different from the data, and the identification information contained in the second data received by the connection unit matches the identification information contained in the data.

Because the first printing device sends the stored print data to the second printing device when data containing identification information identical to print data stored in the storage unit is received, this aspect of the disclosure can reprint print data that was not printed due to an error when data related to the data that was not printed is printed at a later time. Printing can therefore be completed at the appropriate time when much time is required to resolve an error or the time for outputting a printout is limited.

In a printing system according to another aspect of the disclosure, the control unit stores the data in the storage unit when the data could not be printed by the first print unit.

Because the first printing device prints when a second printing device error is detected, this aspect of the disclosure can print quickly even when an error occurs. Furthermore, because the print data is stored and can be reprinted later when the first printing device cannot print, combining substitute printing with reprinting enables reliably producing a desired printout even when an error occurs.

A printing system according to another aspect of the disclosure includes a storage device connected to the first printing device; and the control unit controls the connection unit to transmit the print data stored in the storage unit to the storage device.

This aspect of the disclosure enables rendering a reprinting function without greatly modifying the configuration of the host device by simply connecting the first printing device to the host device.

In a printing system according to another aspect of the disclosure, the data transmitted by the host device contains transaction information; the first printing device includes a print data acquisition unit configured to acquire print data based on the transaction information contained in the data; and the second print unit of the second printing device prints a coupon based on the print data transmitted by the connection unit.

In this aspect of the disclosure the first printing device prints a receipt containing transaction information, and the second printing device prints a coupon related to the receipt printed by the first printing device. As a result, a coupon printing function can be added to a function for printing receipts, for example, without greatly changing the configuration of a host device that transmits print data containing transaction information by simply connecting the first printing device.

Another aspect of the disclosure is a connection unit configured to transmit received data and receives a printing result for the transmitted data; a storage unit configured to store the data; a print unit configured to print; and a detection unit configured to detect if the printing result received by the connection unit is an error.

The printing device includes a control unit configured to determine if a predetermined specific condition is met.

The control unit controls the connection unit to transmit the data stored in the storage unit when the specific condition is met.

This aspect of the disclosure transmits print data based on received data, stores the transmitted data when the result of printing the transmitted print data is an error, and reprints the print data when a specific condition is met. As a result, an external printer can be used to print, and when an error occurs in the external printer, the external printer can be driven to reprint the print data after the error is resolved to acquire the desired printout.

In a printing device according to another aspect of the disclosure, the connection unit transmits the data stored in the storage unit.

This aspect of the disclosure can achieve a reprint function without required an external storage device.

In a printing device according to another aspect of the disclosure, the control unit includes a print data acquisition unit configured to acquire print data based on the transaction information when the data contains transaction information.

This aspect of the disclosure can print receipts containing transaction information based on the received print data, and can output print data for printing a coupon related to the printed receipt. As a result, a function for sending print data for printing a coupon can be added to a function for printing receipts without greatly changing the configuration of the device that outputs print data containing transaction information.

Other objects and attainments together with a fuller understanding of the disclosure will become apparent and appreciated by referring to the following description and claims taken in conjunction with the accompanying drawings.

What is claimed is:

1. A printing system comprising:
 a data input device configured to acquire identification information;
 a host device, connected to the data input device, configured to transmit data, the transmitted data including the identification information acquired by the input device;
 a first printing device including
  a connector that receives the data transmitted by the host device and transmits the data, and
  a first print unit configured to print; and
 a second printing device including
  a second print unit configured to receive the data transmitted by the connector of the first printing device and to print based on the data, and
  an interface that sends a printing result of the second printing device to the connector of the first printing device; wherein
 the first printing device includes
  a detector that detects if the printing result of the second printing device received by the connector indicates an error that occurred in the second printing device, and
  a storage that stores the data transmitted to the second printing device when the detector detects the error in the printing result of the second printing device, and
  a controller that determines if a predetermined specific condition is met, the controller determining that the predetermined specific condition is met when the host device transmits second data different from the data, and the identification information contained in the second data received by the connector matches the identification information contained in the data;
 the controller sends the data that is stored in the storage when the detector detects the error in the printing result of the second printing device to the second printing device when the specific condition is met; and
 the second printing device prints based on the data transmitted as controlled by the controller.

2. The printing system described in claim 1, wherein the first printing device generates print data based on the data transmitted by the host device, and sends the generated print data by the connector to the second printing device.

3. The printing system described in claim 1, wherein when the identification information contained in the second data matches the identification information contained in the data, the first printing device sends the data and the second data to the second printing device; and
 the second printing device prints based on the data and the second data.

4. The printing system described in claim 1, wherein when the detector detects that the printing result is an error, the controller of the first printing device controls printing the data stored in the storage of the first printing device by the first print unit.

5. The printing system described in claim 4, wherein the controller stores the data in the storage when the data could not be printed by the first print unit.

6. The printing system described in claim 1, further comprising:
a storage device connected to the first printing device;
wherein the controller controls the connector to transmit the print data stored in the storage to the storage device.

7. The printing system described in claim 1, wherein
the data transmitted by the host device contains transaction information;
the first printing device includes a print data acquisition unit configured to acquire print data based on the transaction information contained in the data; and
the second print unit of the second printing device prints a coupon based on the print data transmitted by the connector.

8. A printing device comprising:
a connector that transmits received data and receives a printing result for the transmitted data;
a detector that detects if the printing result received by the connector indicates an error that occurred in another printing device;
a storage that stores the data when the detector detects the error in the printing result;
a print unit configured to print; and
a controller that determines if a predetermined specific condition is met, the controller determining that the predetermined specific condition is met when a host device transmits second data different from first data previously transmitted, and identification information contained in the second data received by the connector matches identification information contained in the first data; wherein
the controller controls the connector to transmit the data that is stored in the storage when the detector detects the error in the printing result when the specific condition is met.

9. The printing device described in claim 8, wherein
the controller includes a print data acquisition unit configured to acquire print data based on the transaction information when the data contains transaction information.

* * * * *